Nov. 19, 1968   D. TYREE ET AL   3,411,819
EXPANSIBLE CAMPER
Filed Oct. 25, 1966   4 Sheets-Sheet 1
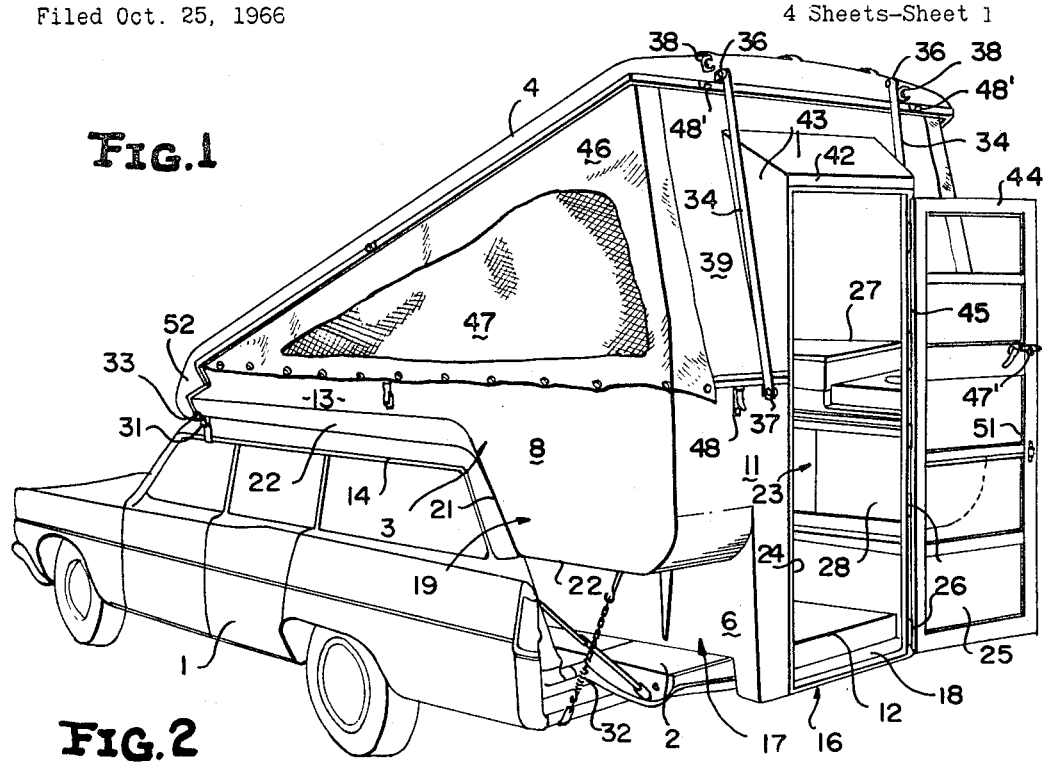
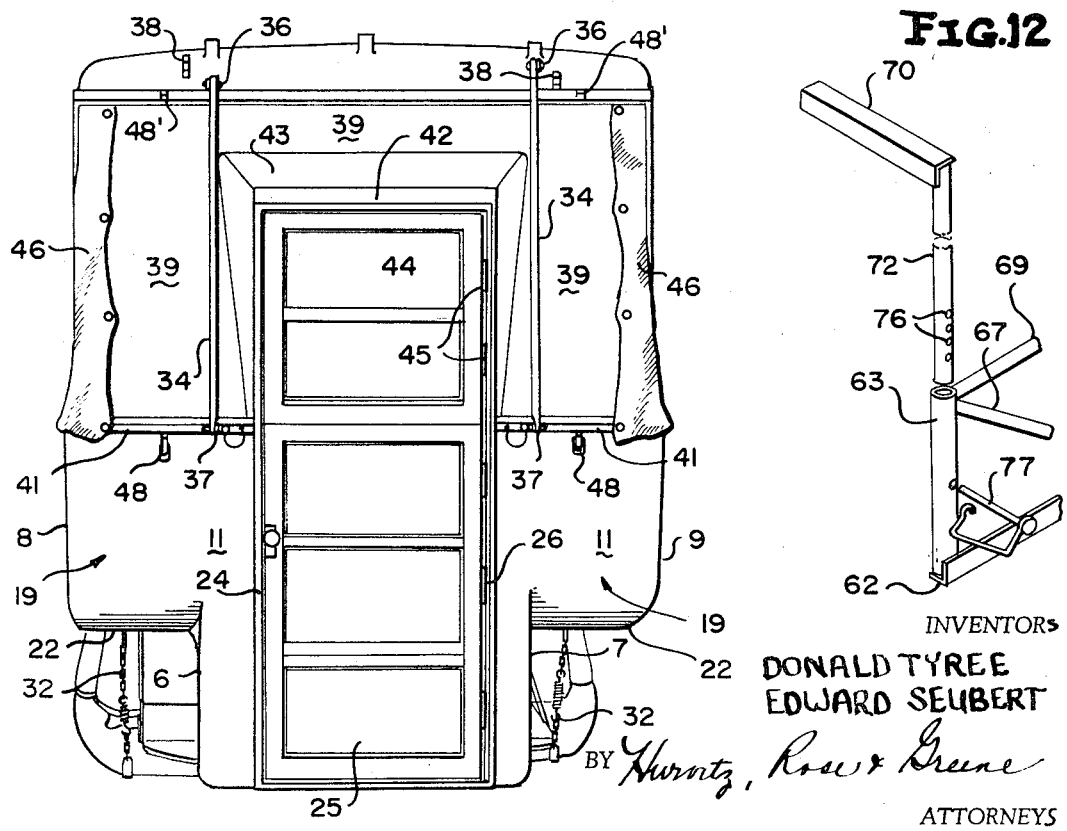
INVENTORS
DONALD TYREE
EDWARD SEUBERT
BY *Hurvitz, Rose & Greene*
ATTORNEYS

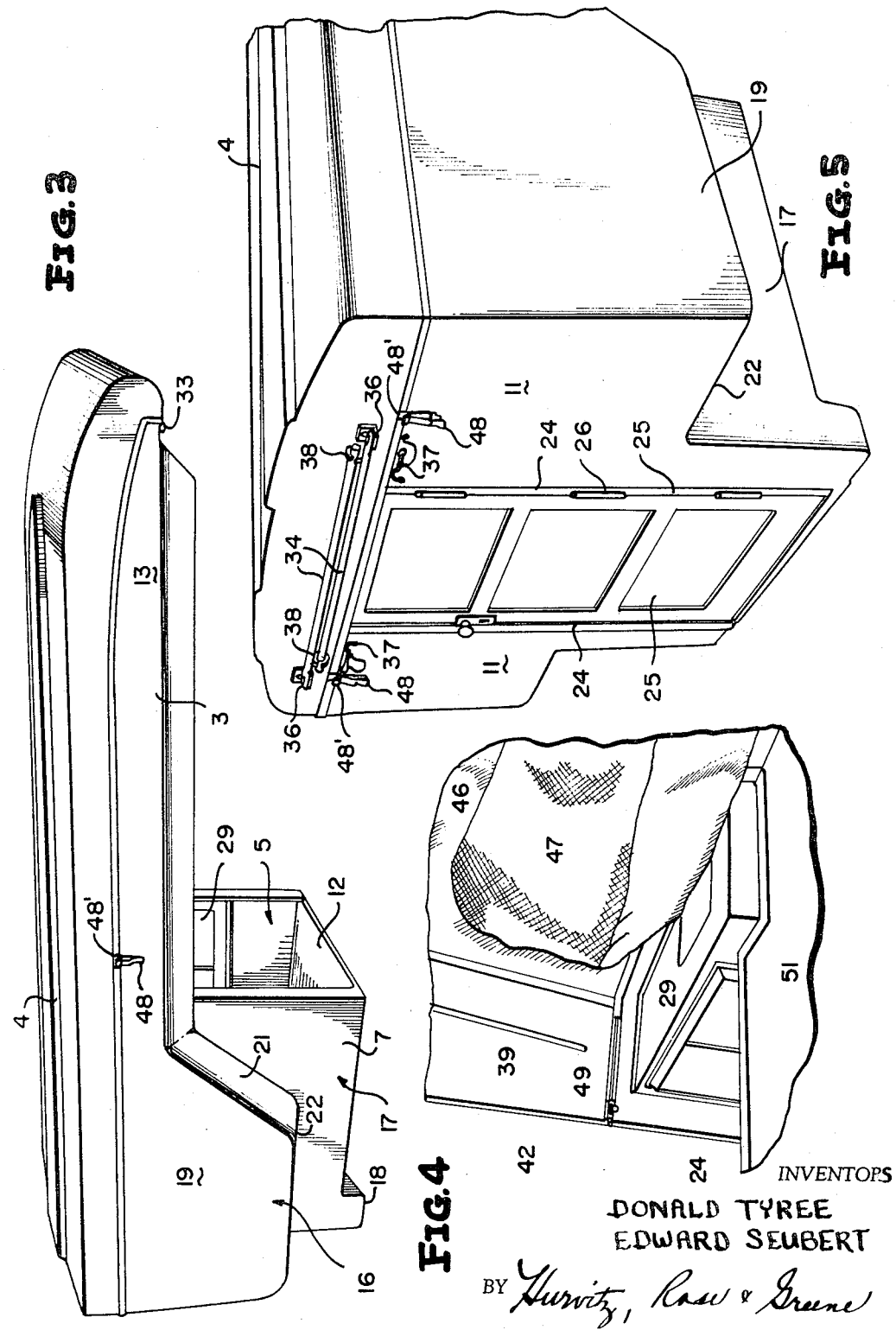

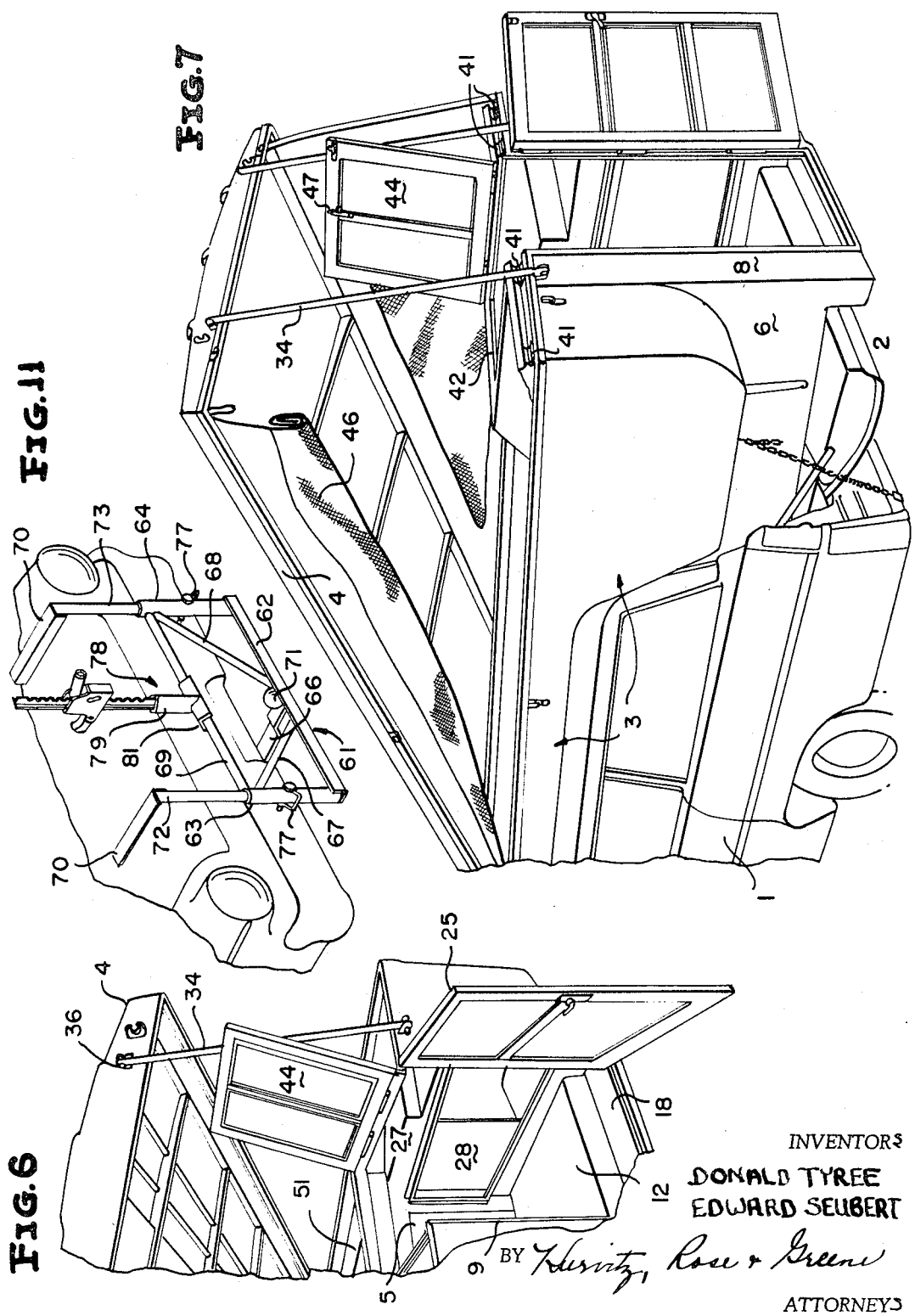

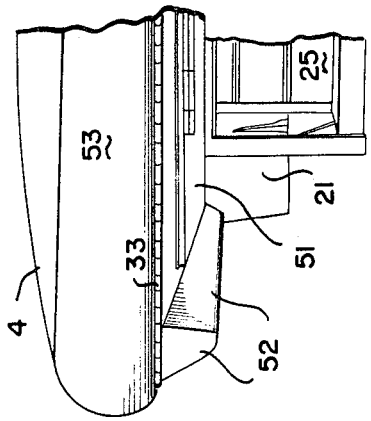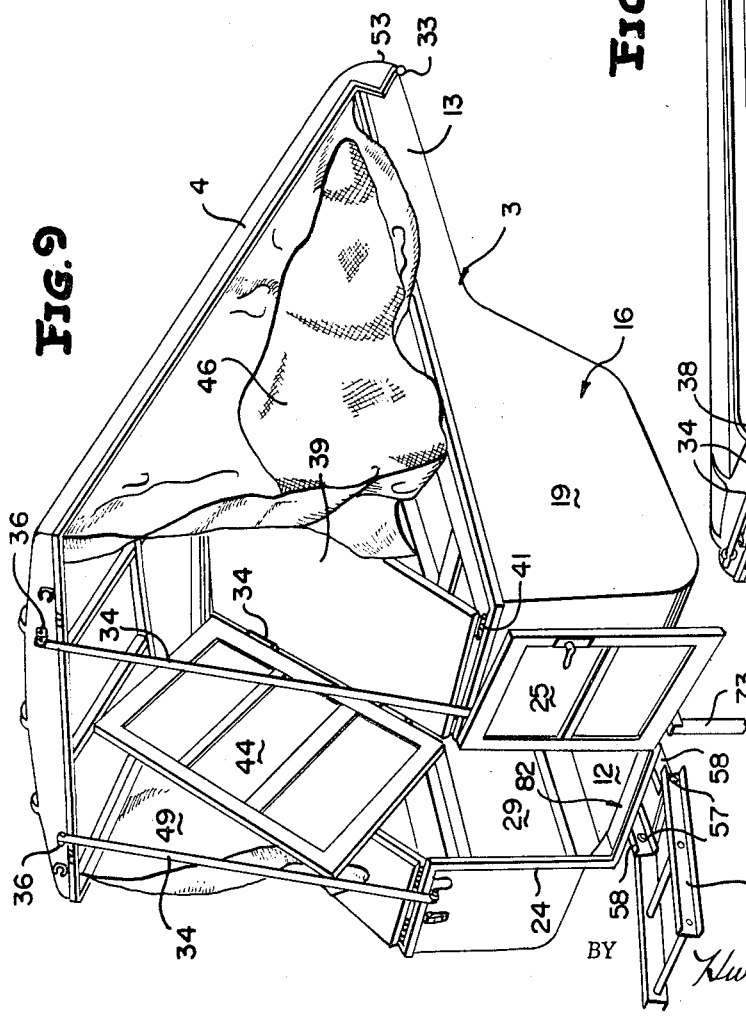

United States Patent Office 3,411,819
Patented Nov. 19, 1968

3,411,819
EXPANSIBLE CAMPER
Donald Tyree and Edward Seubert, both of
Highway 40 W., Boonville, Mo. 65233
Filed Oct. 25, 1966, Ser. No. 589,331
12 Claims. (Cl. 296—23)

ABSTRACT OF THE DISCLOSURE

An automotive vehicle carried camper comprising a rigid base member shaped to conform to the surface of the roof of the vehicle, a roof member pivoted to the base member having a door opening and a panel also having a door opening and hinged to the rear wall, both openings defining a complete opening for a door.

This invention relates to an expansible camper for attachment to automobiles and more specially to a camper which is attached to and mounted on the automobile during both transportation and when it is used as a shelter and which is accessible for use without the necessity of climbing on the top of the automobile and which has the additional capability that it may be used alone at the camp site.

The use of campers with open trucks is known and has been very satisfactory. However, these campers have required that a suitable truck be available to the user. The present invention is concerned with a camper which will provide comfortable camping facilities when the user is at the camping site, will be compact and convenient during travel and will not require that a proper truck will be available. Thus the owner of an automobile will be able to use a comfortable and convenient camper, which though compact enough to be carried on an automobile will provide all necessary camping facilities including sleeping space, cooking facilities and storage space.

It is an object of the invention to provide a camper which is carried as a closed compact unit, offers a minimum of wind resistance, may either remain on the automobile when the camper is expanded to a condition where it may be used for camping or be used alone on the camp site and offers a degree of convenience not heretofore attained.

It is a further object of the invention to provide and mount on an automobile an assembly which contains camping equipment and is easily expanded and closed so that its use will be attractive and convenient.

Essential objects and features of the invention involve proper mounting, balancing and shaping of the entire assembly with respect to the automobile so that it is properly balanced, has proper aerodynamic conformation, good aesthetic appearance and convenience of use.

Other objects and various features of the invention will become apparent to those skilled in the camping equipment art on reference to the following specification and drawings wherein:

FIGURE 1 is a rear perspective view of a first embodiment of the camper in expanded condition mounted on a station wagon type automobile;

FIGURE 2 is a back view of the camper of FIGURE 1;

FIGURE 3 is a side view showing the camper closed and removed from the station wagon;

FIGURE 4 is an interior view of the expanded camper showing details of interior arrangement;

FIGURE 5 is a back perspective view of the camper closed and removed from the station wagon;

FIGURE 6 is a rear view of the camper showing a step in its expansion and also showing interior details;

FIGURE 7 shows a step in the expansion of the camper;

FIGURE 8 shows a detail of construction which materially improves the aerodynamic efficiency of the camper;

FIGURE 9 is a perspective view of a partially expanded camper of a second embodiment of the present invention;

FIGURE 10 is a rear perspective of a second embodiment of the camper which is designed for use with a conventional passenger automobile;

FIGURE 11 is a perspective view of a rear support for the camper of FIGURES 9 and 10; and FIGURE 12 is a close-up view of a portion of the support.

Known campers designed for use with automobiles fall into two categories, either they are removed from the automobile when they are to be used for camping or they are used on top of the automobile, but it is necessary to climb on top of the automobile to so use them. The present camper may remain on the automobile so that its use does not require the physical exertion and inconvenience necessary for its removal every time it is to be used, or if a prolonged stay at the camp site is contemplated and the independent use of the automobile is desired, the camper may be removed from the automobile and mounted on the ground.

Furthermore, the present camper is so arranged that its use does not require climbing on top of the automobile.

In FIGURE 1, the camper is shown in expanded condition mounted on a conventional station wagon 1 shown with tailgate 2 in lowered position. The camper in its entirety consists of a lower base member 3 and roof or lid 4. The lower base member has a front section 13 and a rear section 16. The rear section has lower sidewalls 6 and 7, upper sidewalls 8 and 9, and a rear wall 11 which rise from a floor or flat area 12 to define the interior space which, in the lowered position of the roof or lid, provides storage space and, in the raised position of the lid provides the camper space. The roof or lid 4 overlaps the lower base member and has front, side and rear walls depending from the substantially flat roof portion and mating with the exterior of the walls of the lower member. This arrangement provides a weather-proof closure when the roof 4 is in the lowered position so as to exclude not only rain and snow but also the slush and road dirt which might be thrown up by traffic. The combination of walls on the lower base member and the roof or lid provides substantial storage space when the camper is closed so that supplies necessary for comfortable camping can be stowed in the camper for transportation. Also, it will be noted in FIGURE 3 that the front of the lower member 3 is open at 5 into the rear of the station wagon to provide easy interior access between the camper and vehicle, particularly when the camper is in use. Also, a glass panel may be provided in the rear door so that the interior rear view mirror may be used.

The lower base member 2 has a front section 13 which conforms to the shape of the roof 14 of the station wagon and is supported thereon. The front section 13 of the base member 3 extends from the vicinity of the windshield to the rear of the roof 14. The rear section 16 of the base member 3 extends from the roof to somewhat beyond the lowered tailgate 2 and is composed of three sections. A first section 17 is defined by sidewalls 6 and 7 and rear wall 11 and constitutes a vertical compartment having a rectangular cross-section extending in one dimension from the rear of the roof of the wagon to about the width of a narrow step 18 to the rear of the bumper of the wagon. The step 18 extends below the tailgate and is thus within easy reach of the ground. Station wagons are, of course, of varying sizes so that the aforesaid dimension of the camper is such as to accommodate the largest commercial wagon. The section 17 is provided with the floor 12 that rests on the deck of the wagon.

The section 17 is bounded on both sides by compartments 19 having forward surfaces 21 extending at right angles to walls 6 and 8 and 7 and 9 at the front of the compartment and lying against the posts forming the back braces of the rear side windows of the wagon. These compartments not only provide additional space but provide additional support for the camper. The sections 19 are further defined by bottom walls 22 and sidewalls 8 and 9, respectively. The rear wall 11 of the bottom member 3 defines the back of both the section 17 and the section 19. The wall 11 is provided with an opening 23 in which a lower partial door frame 24 is set. In the lower partial door frame 24 is mounted the lower portion of a door 25 by means of hinges 26.

The sleeping equipment, such as a mattress or mattresses or sleeping bags, is located in the interior of the forward section 13 of the member 3. This portion is better shown in FIGURES 4 and 6 and provides a smooth unbroken surface which is the full width of the station wagon and the length of the sation wagon roof. Immediately behind section 13 and resting on the floor and tailgate of the station wagon is the floor 12 which provides a standing space at the rear of the camper. To both sides of the floor 12 are storage spaces located within the regions 19. As shown in FIGURE 1, a cook stove 27 is located at the top of one of these areas with cabinet 28 below for storage of necessities. As illustrated in FIGURE 4, a similar storage cabinet 29 is provided on the other side of the floor area 12.

The base member 3 is securely fastened to the station wagon by a strap connection 31 which is clamped to the rain gutter of the vehicle or passed over the doors and through the passenger compartment and by chain members 32 which are fastened to the rear bumper.

In order to provide protection to the camper both when in transit and when in use as a camper, the roof or lid 4 is provided. In transit, roof or lid 4, as previously indicated, lies flat on and overlays base member 3 as shown in FIGURE 3. When the camper is used as such, the roof or lid 4 is raised to an inclined position as shown in FIGURES 1 and 7. In order to permit the easy and convenient raising and lowering of the roof, a hinge 33 is provided. The hinge actually used is a continuous hinge commonly referred to as a "piano hinge" although it is apparent that any conventional hinge or pivot arrangement might be used.

In its raised position, roof 4 is supported by rod-like support members 34 which are pivotally attached to the roof by doubled pivots 36 and may be attached to the base by a stud and pin arrangement as indicated by reference numeral 37. As a result of this arrangement, support members are self-storing as shown in FIGURE 5 wherein members 34 are swung horizontally and retained by spring clamps 38 on the roof so that both ends of the members are fastened to roof 4. In the raised position, the upper part of the rear of the camper is enclosed by a panel 39 which is pivotally supported on wall 11 by hinges 41 (see FIGURE 7). Panel 39 is provided with an opening in which an upper partial door frame 42 is set. Panel 39 in the raised position inclines forward while frame 42 must be vertically erect to match the lower partial door frame 24. To permit such erect position of upper partial door frame 42, a section of panel 39 extends outwardly from the main surface of the panel as shown at 43 to permit the proper setting of the upper partial door frame 42.

In the upper partial door frame 42 is mounted upper door portion 44 by means of hinges 45. The upper door portion 44 and lower door portion 25 are aligned and together form the door of the camper. However, these two parts are independent and, if desired, the lower portion may be closed while the upper portion is open to provide more light and ventilation. The sides of the camper when the camper is extended are enclosed by panels 46 of suitable material such as water-proofed fabric which may include regions of screening 47 to provide desired ventilation.

It is apparent that the resulting camper provides camping comfort and convenience. In the camping position, the sleeping quarters are arranged so that persons sleep with their heads toward the rear thus affording adequate head room. If desired, a ceiling lamp may be provided in the interior of the lid.

In the closed position of the lid or roof 4, rear panel 39 with its upper partial door frame 42 and upper door portion 44 are folded forward and rest on cabinets 28 and 29 with means such as hook and eyes being provided to hold the panel firmly to prevent rattling. A latch 47 on the upper door portion 44 and upper partial door frame 42 holds the upper door portion securely closed in both the extended and collapsed positions. The lid or roof 4 lies over the entire lower base member 3 enclosing all the equipment therein including the mattresses or sleeping bags, camping equipment and supplies, and is securely fastened to the lower base member by means of fasteners such as over-center luggage fasteners comprising a hook or post member 48 and a mating loop 48', as shown in FIGURES 1, 3 and 7.

The steps of expanding the camper are as follows. In the closed position, roof 4 is flat in contact with and overlaying base member 3 as shown in FIGURE 3. Fasteners 48, 48' are opened, freeing roof 4. Rod-like support members 34 are freed from receptacles 38. Turning on hinge 33, the roof is raised and supported by rod-like support members 34 as illustrated in FIGURE 7. Panel 39 which is secured to vertical wall 11 by hinges 41 (FIGURE 8) is swung up to an almost vertical position and is fastened to roof 4 by fastening means such as slide bolts 49 to form with the wall 11 the rear wall of the camper. The fabric side panels 46 are detached from the base 3 and folded inward over the sleeping area and the storage cabinets. In raised position, door frame parts 24 and 42 cooperate to make the complete door frame and door parts 25 and 44 cooperate to make the complete door in which the door parts may either be fastened together by fastening means 49, such as a slide bolt fastener to provide a unitary door or the parts may be independent so that the lower part may be closed while the upper part is open to provide additional light and ventilation. The expansion of the camper is completed by fastening the fabric side curtains.

With the camper expanded, the interior is easily accessible from the outside. Step 18 extends below the tailgate and is thus within easy distance from the ground. Floor area 12 is an easy step upward and is the base of the camper, the surface carrying the cook stove, the storage spaces and sleeping quarters are all within easy reach and no climbing is necessary.

When it is desirable to set the camper on the ground at a camp site, the connections 31 and 32 are loosened and the camper may be placed directly on the ground. It is sufficiently light that two men may easily remove it and barrels may be set under the floor 51 of the front end to level the structure.

Although the camper discussed up to this point provides ease and convenience, the structure still required solution of aerodynamic problems to minimize drag and improve handling in a cross wind. In solving this problem, lower base member 3 is provided with downwardly extending skirts 52 along both sides or outer edges as best shown in FIGURE 8. The skirts 52 extend slightly below the top of the roof of the vehicle and are faired into the shape of the vehicle to which it is applied, i.e. are tapered downward and toward the side of the vehicle, to provide a substantially continuous surface of vehicle and camper. Furthermore, the forward end 53 of roof 4 is shaped to completely overlay and enclose the forward end of the lower base member 3. The result is a combined shape of vehicle and camper over which air may flow without excessive turbulence when the camper is closed and the vehicle is traveling. It has been found that the addition of the skirts has reduced fuel consumption at cruising speeds to produce an additional one to two miles per gallon. Furthermore, this arrangement also provides a unitary appearance which is attractive.

Although the camper has been shown with a station wagon, it may be modified so that it is also useful with a conventional passenger automobile. Such a camper is shown in FIGURES 9 and 10, the reference characters where possible being the same as those used in the previous embodiment. In the present embodiment, the forward section 13 of the lower base member 3 is shaped to conform to the roof of a conventional passenger automobile and the depending or rear section 16 is shaped to conform with the slope of the rear window and the surface of the trunk. Since no part of the camper can be within the body of the automobile, the central depending section 17 of the embodiment of FIGURES 1 to 8 is dispensed with and the camper terminates at the bottom of the side storage areas 19. Otherwise, the construction of this embodiment is identical with that of the first embodiment except that since depending section 17 is not used, the bottom of door 25 is higher off the ground and a ladder 56 is used to provide access to door 25 and the camper. The side members of the ladder 56 are attached by pivots 57 to brackets 58 secured to the bottom of the rear section 16 of the camper. In its raised position, the ladder 56 is fastened to the vertical rear wall 11 by means of a fastener 59 which might be a hook type fastening. The front section 13 of the camper is fastened to the vehicle in the same manner as the embodiment of FIGURE 1, using the same fastener 31 for connection to the rain gutter. In order to provide convenient access to the trunk of the vehicle over which the camper is positioned, means must be provided to conveniently raise the camper while also permitting the rear section to be securely held in place during travel.

The means for supporting the camper at the rear of the vehicle is illustrated in FIGURES 11 and 12. There is provided a U-shaped hollow tubular member 61 having a base member 62, and vertical arms 63 and 64. One end of a flat heavy bar 66 is secured (as by welding) at right angles to the base member 62 and the other end is securely fastened to the frame of the vehicle. Bracing members 67 and 68 extend, respectively, from the upper ends of arms 63 and 64 to the bar 66 and a further cross bracing member 69 extends between the upper ends of the arms 63 and 64 thereby providing triangular support elements. A pintle 71 may be secured to the bar 66 between braces 67 and 68 so that a trailer may be towed.

The arms 63 and 64 are open at their upper ends to slidable receiver posts 72 and 73. Angle irons 70 are secured to the upper end of each post 72 and 73 and also to the underside of the rear section 16 of the lower base member 3. The arms 63 and 64 have a plurality of vertically aligned holes 76 drilled through as do the posts 72 and 73. Locking pins 77 are provided which, when one set of holes in the arms and posts are aligned, may be passed through the holes to secure the rear section of the camper to the vehicle. As indicated, several sets of holes 76 are provided in order to accommodate different heights of vehicles between the roof and deck.

In order to raise the camper to get into the trunk, a conventional bumper jack may be employed although a special base fitting 78 is required. The base fitting 78 comprises the conventional vertical member 79 for receiving the shaft of the jack and a short length of angle iron 81 at right angles thereto. The angle iron sits on the cross brace 69 and the lifting surface of the jack engages the underside of the door frame 24 generally at a location designated by the reference numeral 82 of FIGURE 9.

The camper may be raised by removing locking pins 77, putting the jack in position and operating it. Usually front retainers 31 do not have to be loosened but may be if desired.

This camper could be set up on the ground at a camp site in the same manner as previously discussed with respect to the camper for a station wagon, the same supports being equally applicable.

The invention provides an expansible camper which is easy to operate, requires no great strength or dexterity, is very convenient, minimizes the effects of aerodynamic drag and cross-winds and is aesthetically attractive.

While we have described and illustrated one specific embodiment of my invention, it will be clear that variation of the details of construction which are specifically illustrated and described may be resorted to without departing from the true spirit and scope of the invention as defined in the appended claims.

We claim:
1. An automotive vehicle carried camper comprising
 (a) a base member having a first section whose bottom is shaped to conform to the surface of the roof of the automotive vehicle, a second section extending rearwardly and also downwardly from the first section to conform to the shape of the rear of the vehicle to provide a platform and storage space, a vertical rear wall enclosing the back of said base member, an opening in said rear wall defined by a lower door frame to provide access into said second section and hence into the camper,
 (b) a roof member pivotally secured to said base member at the forward end thereof, said roof member having downwardly depending edges covering said base member when said camper is closed,
 (c) support means for holding said roof member in a raised position,
 (d) a panel member hingedly attached to said vertical rear wall, said panel member when raised cooperating with said vertical rear wall to constitute a rear wall of the expanded camper and which when lowered lies flat under the roof member, an opening in said panel member defined by an upper door frame, said lower and upper door frames defining a complete door frame, and
 (e) a door hingedly attached to said complete door frame to constitute a closure for the opening.

2. An automotive vehicle carried camper according to claim 1 wherein said door comprises two separate door sections, the first of which is hingedly attached to said vertical rear wall and the second of which is hingedly attached to said panel member.

3. An automotive vehicle carried camper according to claim 1 wherein said base member is provided with downwardly extending skirt member at both sides thereof which fairs the shape of the carrier into the shape of the vehicle to minimize the effects of aerodynamic drag and cross winds.

4. An automotive vehicle carried camper according to claim 1 wherein said base member conforms to the shape of a station wagon with its tailgate lowered and includes a central depending portion at the rear thereof which extends down to and contacts the floor and tailgate of the station wagon.

5. An automotive vehicle carried camper according to claim 4 wherein said central depending portion includes a further rearward extending portion which extends below the tailgate to provide a step for easy access to the camper.

6. An automotive vehicle carried camper according to claim 1 wherein means are provided to support said camper on the ground, said last mentioned means comprising a plurality of adjustable length leg members releasably attached to the bottom of the base member at the forward end thereof.

7. An automotive vehicle carried camper according to claim 1 wherein the base member conforms to the shape of a conventional passenger automobile and the second portion of the base member conforms to the shape of the rear window and trunk of the automotive vehicle.

8. An automotive vehicle carried camper according to claim 7 wherein means are provided to raise the rear of said camper to expose the trunk lid for access to said trunk, said last mentioned means comprising jack means adapted to contact the bottom of said base member at the rear thereof and the bumper of vehicle whereby extension of said jack means raises the rear portion of said base member to expose said trunk lid.

9. An automotive vehicle carried camper according to claim 7 wherein a ladder is pivotally attached to the vertical rear wall below the opening to provide steps for easy access to the camper.

10. An automotive vehicle carried camper comprising;
 (a) a rigid base member having a first portion whose bottom is shaped to conform to the surface of the roof of the vehicle, a second portion extending rearwardly from the first portion and also extending downwardly to conform to the shape of the rear of the vehicle to provide a platform which may support sleeping equipment, storage space and an access area, a vertical rear wall enclosing the rear end of the base member having an access opening therein,
 (b) a roof or lid member pivotally secured to the base member at the forward end thereof so that in the closed position, it completely covers the base member and in the raised position, it serves as the roof for the camper,
 (c) support means for holding the roof or lid member in its raised position, and
 (d) a panel member hingedly attached to the vertical rear wall which when raised cooperates with the vertical rear wall to constitute the rear wall of the expanded camper and which when lowered lies flat under the roof member, said panel having an opening which together with the opening in the vertical rear wall constitutes the access opening into the camper and means provided for covering the sides of the expanded camper.

11. An automotive vehicle carried camper according to claim 10 wherein a partial door frame is provided for each of the openings in the vertical rear wall and the panel member.

12. An automotive vehicle carried camper according to claim 11 wherein a partial door is hinged to each of the partial door frames and the two partial doors together constitute the access door to the camper.

References Cited

UNITED STATES PATENTS

| 3,288,519 | 11/1966 | McFarland | 296—23 |
| 3,326,594 | 6/1967 | Van Atta | 296—23 |
| 3,186,754 | 6/1965 | Winstead | 296—23 |

PHILIP GOODMAN, *Primary Examiner.*